INVENTOR
BYRON L. GODBERSEN
BY
ATTORNEY

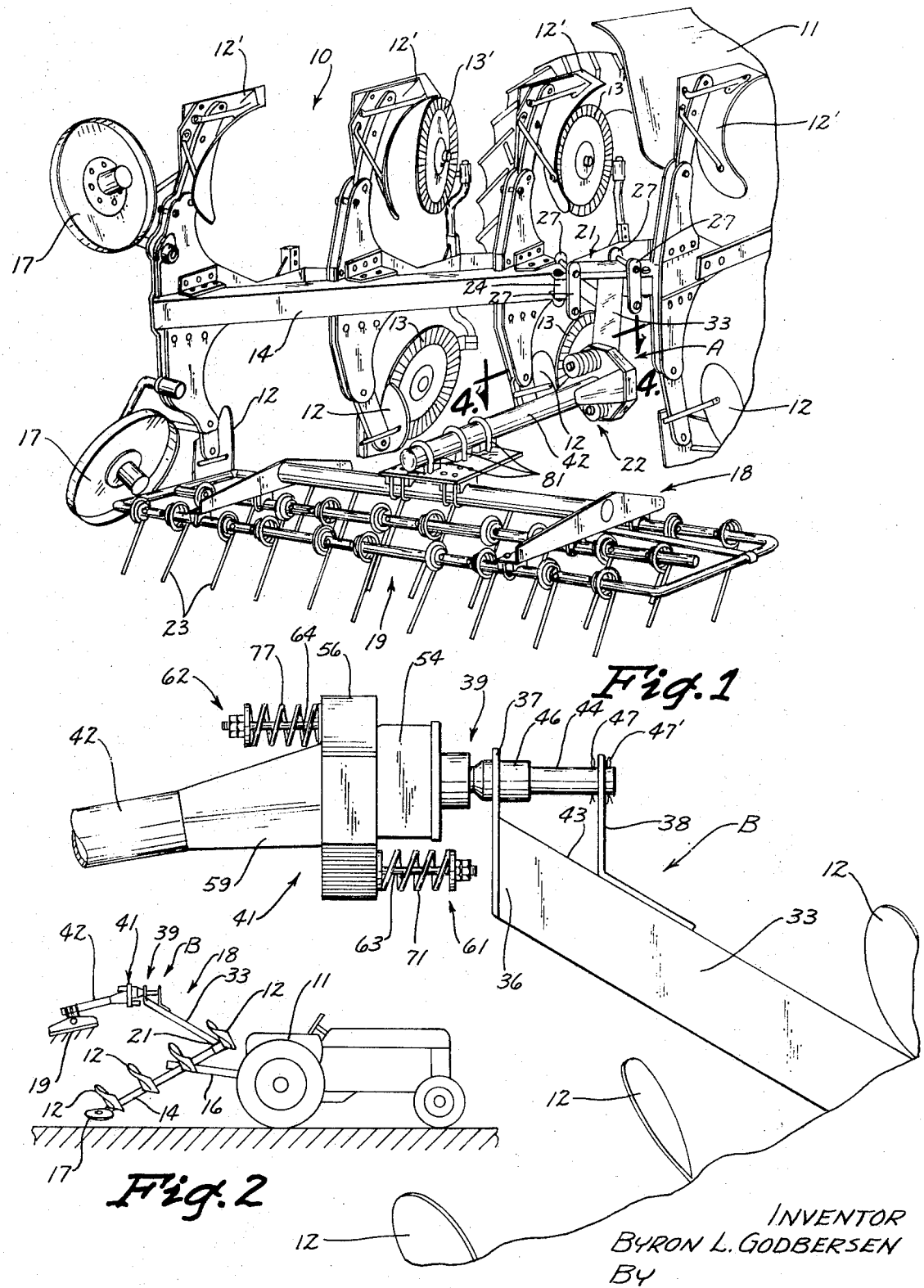

United States Patent Office

3,523,584
Patented Aug. 11, 1970

---

3,523,584
HARROW ATTACHMENT FOR ROLL-OVER PLOW
Byron L. Godbersen, Ida Grove, Iowa 51445
Filed Jan. 29, 1968, Ser. No. 701,206
Int. Cl. A01b *49/02*
U.S. Cl. 172—161
4 Claims

---

ABSTRACT OF THE DISCLOSURE

This invention relates to a ground engaging harrow attachment to an arcuately movable roll-over plow beam pivotally connected to a tractor or its frame, the attachment having a swivel unit mounted on a shaft connecting the harrow to the plow, the swivel unit automatically positioning the harrow in a horizontal ground working position in response to rotational movement of the plow frame.

---

BACKGROUND OF THE INVENTION

Several arrangements are presently employed to swivelly connect a ground working implement to a tractor or to a frame extending from a tractor for the purpose of allowing the implement to roll freely with the contour of the land.

However, the field of this art is presently void of a ground working implement swivelly connected to another ground working implement the latter of which is pivotally mounted on the tractor or its frame.

SUMMARY OF THE INVENTION

This invention relates to a ground engaging harrow attachment to a roll-over plow beam, the beam being pivotally connected to a tractor or its frame and movable in an arcuate direction, the attachment having a shaft connected to the plow beam and extending rearwardly in a diverging direction therefrom, the shaft being movable in an arcuate direction in response to movement of the plow beam, a harrow operable in a horizontally disposed position, the harrow connected to a boom, and a swivel unit interconnecting the shaft and boom for maintaining the harrow horizontally at all times during movement of the shaft.

It is an object of this invention to provide a novel and improved harrow attachment for a roll-over plow.

It is another object of this invention to provide a freely rotatable harrow wherein the harrow rotates in response to rotation of the plow.

It is still another object of this invention to provide a harrow attachment for a roll-over plow wherein the harrow is self-positioning relative to the position of the plow.

Yet another object of this invention is to provide a harrow attachment for a roll-over plow frame wherein the harrow can be swung from an operative position in engagement with the ground, to a transport position supported above the plow frame in response to the rotation of the plow frame from its own operative position to a transport position.

Another object of this invention is to provide a harrow attachment having a split shaft for a roll-over plow whereby lateral movement of one portion of the shaft is substantially prevented relative to the other portion.

Still another object of this invention is to provide a novel apparatus for flexibly and resiliently attaching a harrow to a roll-over plow.

It is also an object of this invention to provide a harrow mounting for a roll-over plow which is economical, rugged, and easily serviced.

These and other objects of this invention will become readily apparent when taken in conjunction with the accompanying drawings.

BRIEF DESCRIPTION OF THE DRAWINGS

FIG. 1 is a perspective view of the harrow attachment of this invention, shown connected to a plow frame;

FIG. 2 is a reduced side elevational view showing the harrow attachment and plow frame in transport position;

FIG. 3 is an enlarged fragmentary view of the swivel connection of this invention, shown in the position of FIG. 2;

DESCRIPTION OF THE PREFERRED EMBODIMENT

Figure 4:
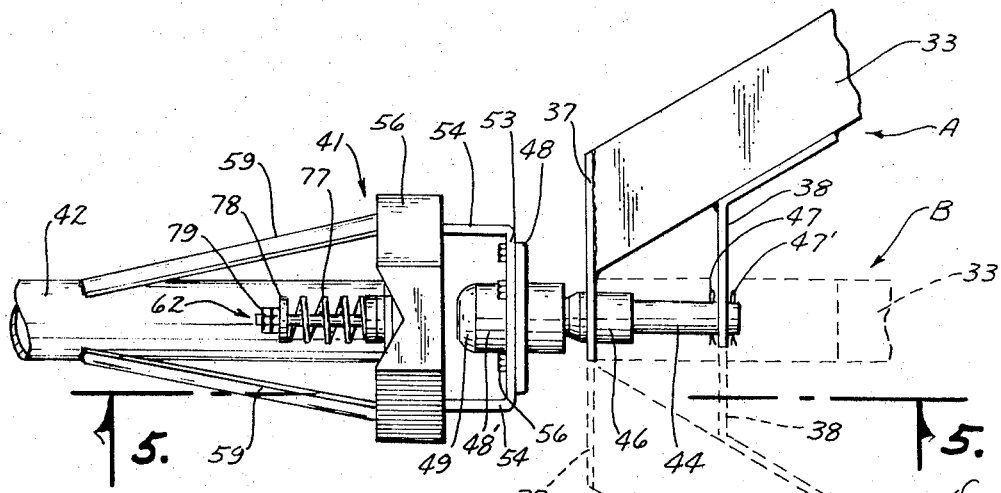
FIG. 4 is a top plan view as taken along the line 4—4 of FIG. 1 and showing alternate positions of the boom section by means of full and dotted lines.

Referring now to the drawings and particularly FIG. 1, a moldboard roll-over plow is indicated generally at 10 connected to a tractor 11. The plow 10 resembles a conventional four bottom plow in that only four bottoms 12 engage the ground at any one time. The plow 10 includes two sets of four bottoms 12 and 12' and rolling coulters 13 and 13' attached to a beam 14 rotatably connected to a shaft 16 (FIG. 2) attached to the tractor 11. When the plow 10 is in operation the plow is supported by a trailing wheel 17.

A roll-over plow 10 finds its dominant use in those regions employing contour farming methods wherein the operator may sweep around a hill and by rolling the plow 10 over, he may turn around and continue in the same furrow as he previously followed. The plow 10 is designed so that the bottoms 12 and 12' will turn the ground over in the same direction if the tractor 11 is turned around and the plow 10 is rolled over. In the operative position of the plow beam 14, the bottoms 12 and 12' are in a vertically opposed condition as regards each other.

The harrow attachment of this invention is indicated generally at 18 in FIGS. 1 and 2, and comprises basically the harrow 19, a mounting bracket 21 connected to the beam 14, and a split shaft unit 22 interconnecting the harrow 19 and the mounting bracket 21.

In this distance, the harrow 19 is a spring tooth type harrow wherein the spring teeth, indicated at 23 in FIG. 1, are pivotally mounted for yieldable engagement with the soil. The invention, however, is not limited to a particular harrow, nor is it limited to use with a particular roll-over plow 10.

Figures 6, 7:
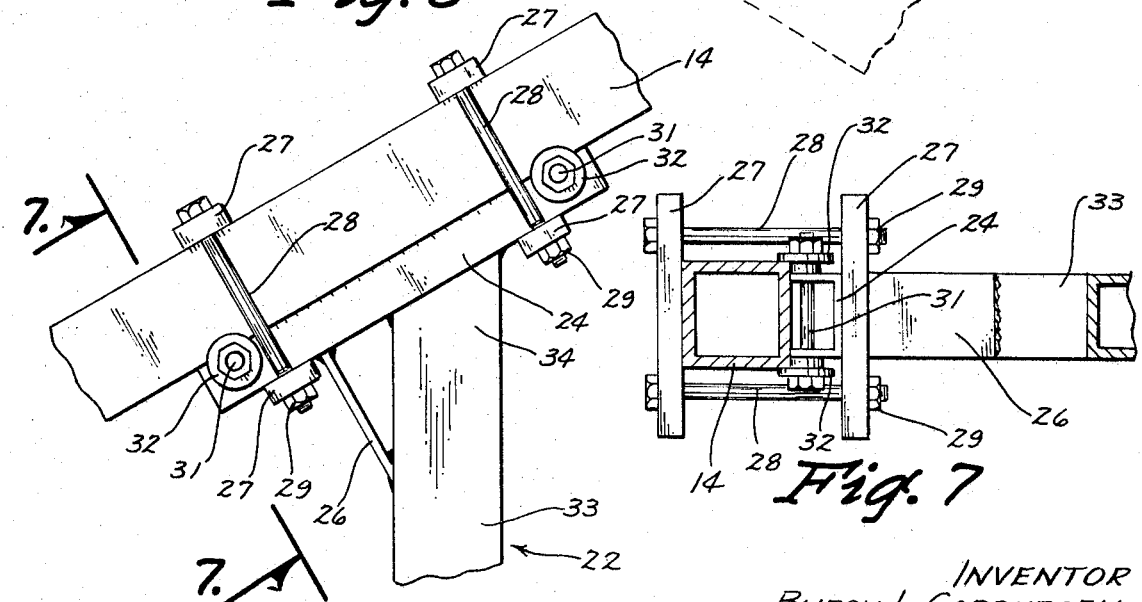
FIG. 6 is a fragmentary plan view of the connection of the harrow attachment at the plow beam.
FIG. 7 is a sectional view as taken along the line 7—7 of FIG. 6.

The mounting bracket 21 (FIGS. 1, 6 and 7) includes a beam 24 to which one end of the shaft unit 22 is connected, and a plate 26 interconnecting the beam 24 and shaft 22 to lend lateral support to the shaft 22. The beam 24 is shown held against a side of the plow beam 14 by a quartet of vertically disposed bars 27, two of which are against the exposed side of the beam 24 and the other two of which are held against the opposite side of the plow beam 14. The bars 27 are interconnected over and under the beams 14 and 24 by a quartet of connecting bolts 28 and secured by a quartet of nuts 29.

The beam 24 is horizontally centered on the plow beam 14 and vertically secured by a pair of vertically disposed bolts 31 (FIG. 6), inserted through apertures (not shown) bored through the beam 24, and a quartet of spacers 32 which engage the exterior horizontal surfaces of the beams 14 and 24 and retard vertical movement of the beam 14. The depth of the spacers 32 is dependent upon the particular plow 10 employed as this invention is not limited to a particular roll-over plow nor is the resilient rotary shaft unit 22 limited to a particular mounting bracket 21.

The shaft unit comprises an elongated shaft 33 (FIGS. 1 and 2) secured as by welding at one end 34 to the mounting bracket 21, a swivel unit 39 (FIG. 3) pivotally connected to the other end 36 of the shaft 33, a linkage unit 41 connected to the swivel unit 39, and a boom 42 interconnecting the linkage 41 and the harrow 19.

The shaft 33 is an elongated, straight member rectangular in cross section, the inner end 33 secured to the plow beam 14 at an angle of approximately 60° to the longitudinal axis thereof. Referring to FIG. 1, it is noted the connection of the shaft 33 with the beam 14 is closely adjacent the end thereof closest to the prime mover 11, and wherein the shaft 33 extends rearwardly and away from the plow beam 14 in a diverging manner therefrom. When the plow beam 14 is rotated to a position where one of the four bottoms 12 or 12' is in a ground engaging position, the shaft 33 is extended substantially horizontally.

A trunnion is formed at the outer end 36 (FIG. 3) of the shaft 33 by a pair of spaced plates 37 and 38 having axially aligned apertures 37' and 38' (FIG. 8) formed therein to receive a portion of the swivel unit 39. The swivel unit 39 (FIG. 3) comprises an elongated spindle 44 (FIG. 8) including a collar 46 firmly attached to the spindle 44. The spindle 44 is rotatably inserted through the apertures 37' and 38' of the end plate 37 and bracket 38, and is located by appropriately placed cotter pins 47 and 47'.

A flanged face plate 53 (FIG. 4) having two substantially parallel sides 54 is secured, as by welding, to a portion of the break-away linkage unit 41. The face of the face plate 53 (FIG. 8) includes a center hole 53' to receive inner end 48' of a hub 48, attached to the face plate 53 by a plurality of bolts 56 inserted through threaded holes formed therefor in the plate 53.

Figure 8:
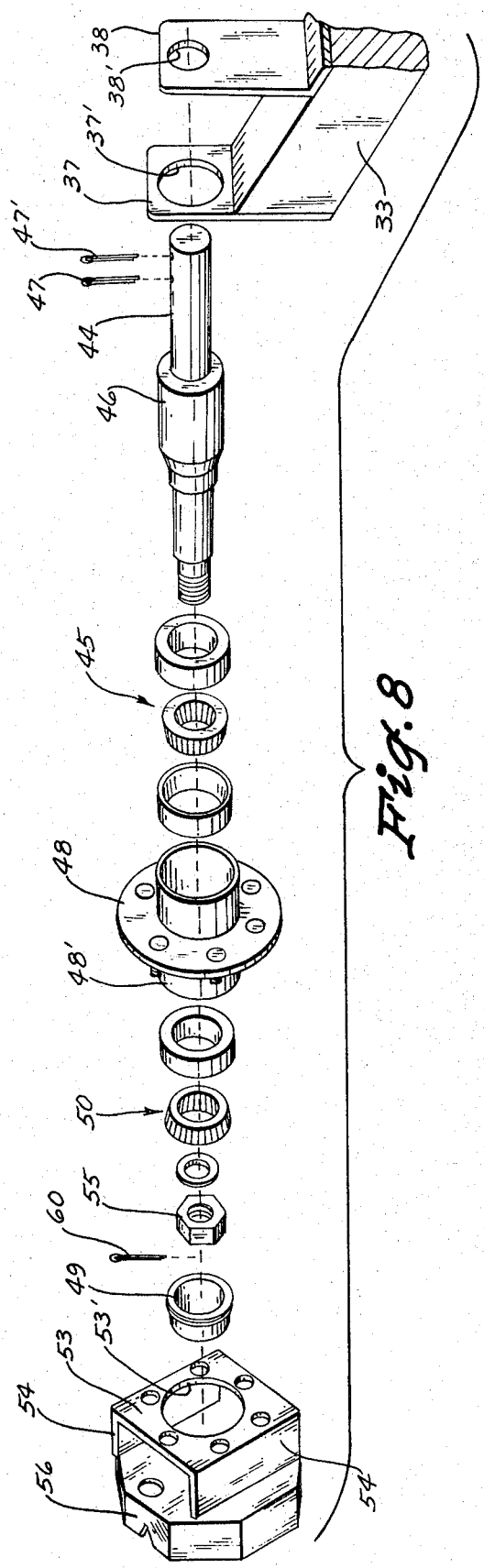
FIG. 8 is an exploded view of the spindle unit of this invention.

The spindle 44, extended axially parallel to the direction of travel of the tractor 11, and substantially horizontal to the level of the ground, is inserted through roller bearing units indicated generally at 45 and 50 in FIG. 8, each of which is supported in a respective end of the hub 48. The spindle 44 is snugly secured at its inner end to the hub 48 as by a threaded nut 55 and cotter key 60, covered by a hub cap 49, to complete the swivel unit 39.

The break-away linkage unit 41 includes a flat plate 51 positioned substantially parallel to the end plate 37 attached to the shaft 33. Integral with the plate 51 and extending axially relative to the unit 41 is a flange 56 (FIG. 4), forming generally an octagonal cup with the plate.

A second plate 57 (FIG. 5), concave-convex in shape, the concave face adapted to be positioned in juxtaposed relation to the flat plate 51, is secured centrally on the convex face as by welding to the other end 58 of the boom 42. The plate 57 extends laterally substantially at right angles to the longitudinal axis of the boom 42. It will be noted in FIG. 5 that the lateral dimension of the curved plate 57 is smaller than the lateral dimension of the flat plate 51, thus allowing the plate 57 to be poisitioned between the flange 56 attached to the flat plate 51. A pair of concave elements 59 are secured to the plate 57 and the boom 42 (FIGS. 4 and 5), to provide rigidity to the plate 63 and lateral support to the boom 42.

To maintain the contact between the face of the flat plate 51 and the concave surface of the second plate 57, a pair of resilient connections 61 and 62 (FIG. 5) is provided. Each connection includes a bolt 63 and 64 respectively, an L-shaped washer 66 and 74 respectively, a pair of spring retainers 69, 72 and 76, 78 respectively, springs 71 and 77 respectively, and locking nuts 73 and 79 respectively. To provide for the connectors 61 and 62, each plate 51 and 57 has a pair of apertures (not shown) formed in vertically spaced relation near the top and bottom of each plate. Upon horizontal alignment of each pair of apertures (not shown) of the plates 51 and 57, a bolt 63 and 64 of each connector 61 and 62 can be passed therethrough.

Figure 5:
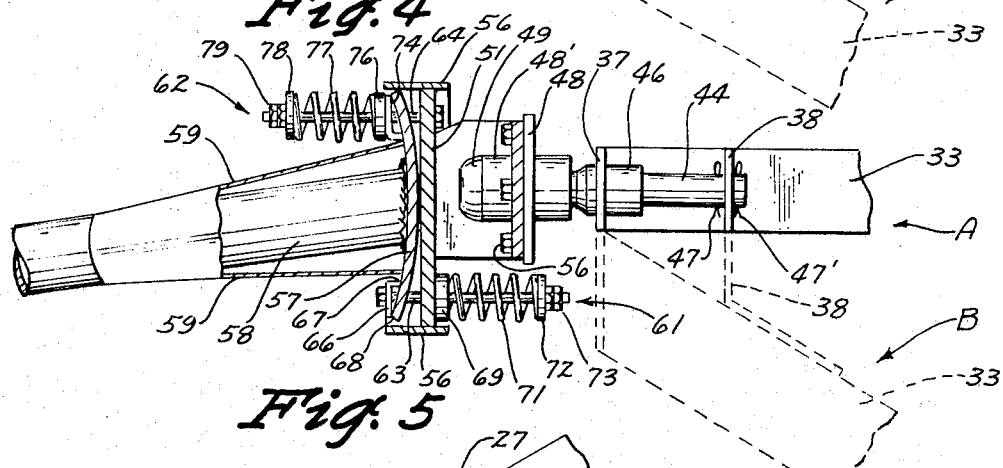
FIG. 5 is a sectional view as taken along the line 5—5 of FIG. 4 and showing alternate positions of the boom section by means of full and dotted lines.

Referring to FIG. 5, the bolt 63 of connector 61 is inserted through an L-shaped washer 66, the lateral ends 67 and 68 of the washer 66 being contiguous with the convex face of the plate 57 and thereby keeping the face of the washer 66 perpendicular to the longitudinal axis of the bolt 63, and through the aligned apertures of the respective plates 51 and 57. Embracing the bolt 63 and held next to the adjacent plate 51 is a flanged or guide washer 72 facing the washer 69, and a locking nut 73.

The connector 62 (FIG. 5) is identical to connector 61, however, the direction of the extended connector 62 is reversed. The bolt 64 is first inserted through the apertures provided in the plates 57 and 51, then through the L-shaped washer 74, the guide washer 76, compression spring 77, a second guide washer 78, and a locking nut 79. The connectors 61 and 62 are substantially parallel to each other in the same vertical plane and are individually adjustable as regards the compression of the springs 71 and 77.

In use, the resilient connection unit 41 (FIG. 4) serves a threefold purpose. One purpose is to serve as a shock absorber while the plow and harrow are being transported over a rough field or road and thus relieve some of the tension from the shaft 22 (FIGS. 1 and 2). Another purpose is to allow the shaft to give and finally break away, should the harrow 19 engage a post or other upstanding object while extended in operating position (FIG. 1). This alleviates uneven stress and possible damage to both the shaft 22 and the harrow 19. Another purpose of the connection unit 41 is to permit the operator to quickly and easily regulate the working pressure upon the harrow by increasing or decreasing the tension upon the approtionate connector 61 and 62. Thus, by tightening the top connector 62 (FIG. 5) and loosening the bottom connector 61, the downward pressure upon the harrow 19 (FIG. 1) is lessened and the implement will not penetrate the soil as deeply.

The harrow 19 is centrally attached to the end of the boom 42 by a plurality of U-bolts 81 (FIG. 1) in such a manner as to approximately balance the harrow 19 upon the rotatable boom 42. While the balance of the harrow 19 need not be perfect as the harrow 19 will position itself in working position upon engagement with the soil, the harrow 19 of necessity can not be attached so far from the longitudinal center of the harrow as to cause the "tipping" to be so great that the teeth 23 are substantially horizontal.

In the use of the harrow attachment 18 of this invention, referring to FIG. 1 the attachment 18 is shown holding the harrow 19 in a position generally indicated at A. In this position A, it will be noted that the plow beam 14 has been rotated such that the plow bottoms 12 are in a ground engaging position with the plow bottoms 12' being disposed in a vertically opposed relation thereto. Both the shaft 33 and the boom 42 of the harrow attachment 18 are disposed in generally horizontal planes in position A, although due to the weight of the harrow 19 on the boom 14 the latter tends to decline slightly from the horizontal. In this position A of the harrow attachment 18 and the plow 10, both the plow bottoms 12 and coulters 13, and the harrow 19 are in a ground engaging position.

Upon rotation of the plow 10 to place the plow bottoms 12' in a ground engaging position, which rotation would be counterclockwise as one views the plow 10 in FIG. 1, when the beam 14 is in a position with both sets of plow bottoms 12 and 12' generally opposed to each other in a horizontal condition, the arrangement as viewed from the side is best illustrated in FIG. 2. In this position, indicated generally at B in FIGS. 2 and 3 particularly, the shaft 33 extends upwardly and away in a diverging relation to the plow beam 14. The harrow 19 has remained in a generally horizontal position due to the pivotal relation of the boom 42 and its linkage unit 41 affixed thereto with the swivel unit 39, and wherein the latter unit has rotated relative to and with the arcuate movement of the shaft 33. Again, due to the weight of the harrow 19 the boom 42 will depend slightly from the horizontal as illustrated in FIGS. 2 and 3.

Referring to FIGS. 4 and 5, with FIG. 4 showing the position of the boom 42 and the shaft 33 in full lines, which position is also shown in FIG. 1, the relationship of the shaft 33 to the boom 42 as seen in plan view in the position B is shown by the use of dotted lines as to the shaft 33. FIG. 5 also shows the relative positions of the boom 42 and the shaft 33 in the position B where the shaft 33 has been raised to a point approximately midway between full rotation of the plow beam 14 from its FIG. 1 position to an opposite position with the plow bottoms 12' in a ground engaging condition.

The position of the plow bottoms 12' in a ground engaging condition or position (not shown) would rotate the harrow attachment shaft 33 to a position the opposite of that shown in FIG. 1, and wherein again the horizontally disposed shaft 33 would extend outwardly and away in a diverging relation to the plow beam 14, and also with the boom 42 being in a generally horizontal position except for a slight dependency therefrom due to the weight of the harrow 19. The relative position of the shaft 33 and the boom 42 in the position of the plow bottoms 12' engaging the ground is shown in FIG. 4 by the use of dotted lines for the shaft 33, with its position indicated at C.

It is therefore seen that regardless of the position of the plow beam 14, whether in its two extreme conditions with either set of plow bottoms 12' placed in a soil engaging position, or at any intermediate point therebetween, the arrangement of the harrow attachment 18 is such that the harrow 19 itself is always retained in a generally horizontal position for ground working.

Although a preferred embodiment of this invention has been disclosed and described herein, it is to be remembered that alterations and modifications are contemplated without truly departing from the spirit and scope of the invention as defined in the appended claims.

I claim:

1. A harrow attachment for a roll-over plow frame having a plow beam movable in a arcuate direction, a pair of conventional plowing devices mounted on the plow beam in normally vertically opposed relation, either of which is movable to a ground engaging position by the plow beam, the attachment comprising:

a ground engaging harrow operable in a horizontally disposed position;

shaft means connected to the plow beam and movable in an arcuate direction in response to movement of the plow beam;

boom means connected at one end to said harrow;

linkage means resiliently connected to said boom means at the other end thereof, said boom means angularly movable relative to said linkage means about its connection therewith; and swivel means interconnecting said shaft means and and said linkage means for maintaining said harrow in said position at all times during movement of said shaft means.

2. A harrow attachment as defined in claim 1, and further wherein said shaft means includes an elongated shaft extended rearwardly and away from the plow beam in a diverging manner and extended substantially horizontal when the plow beam is rotated to a position with one of the plowing devices in a ground engaging position.

3. A harrow attachment as defined in claim 2, and further wherein said swivel means includes a spindle connected to said shaft means, the longitudinal axis of said spindle extended parallel to the direction of travel of the plow frame.

4. A harrow attachment as defined in claim 3, and further wherein said linkage means includes a pair of vertically disposed resiliently connected plates one of which is connected to said boom means, said one plate having a concave shape and positioned against the other plate and movable in all degrees thereabout.

References Cited

FOREIGN PATENTS

| 10,355 | 5/1907 | Great Britain. |
|---|---|---|
| 475,956 | 6/1915 | France. |
| 1,356,464 | 2/1964 | France. |

ROBERT E. PULFREY, Primary Examiner

JAMES W. PETERSON, Assistant Examiner

U.S. Cl. X.R.
172—203, 223, 710